United States Patent [19]
Rebhan et al.

[11] Patent Number: 5,635,811
[45] Date of Patent: Jun. 3, 1997

[54] METHOD AND APPARATUS FOR STANDSTILL RECOGNITION WHEN RESTARTING A POWER CONVERTER-FED AC MOTOR WITHOUT A TACHOMETER GENERATOR

[75] Inventors: Matthias Rebhan, Fuerth; Hubert Schierling, Erlangen, both of Germany

[73] Assignee: Siemens Aktiengesellschaft, Munich, Germany

[21] Appl. No.: 474,719

[22] Filed: Jun. 7, 1995

[30] Foreign Application Priority Data

Jun. 30, 1994 [EP] European Pat. Off. ............ 94110231

[51] Int. Cl.$^6$ ................................ H02P 5/40; H02P 6/00
[52] U.S. Cl. ......................... 318/778; 318/800; 318/806; 318/798
[58] Field of Search ..................... 318/699–836, 318/138, 254; 363/49, 37, 164, 36, 159, 148, 163, 39, 160; 323/207

[56] References Cited

U.S. PATENT DOCUMENTS

| | | | |
|---|---|---|---|
| 3,989,991 | 11/1976 | Brennen et al. | 318/227 |
| 4,282,473 | 8/1981 | Dreisetl et al. | 318/803 |
| 4,451,112 | 5/1984 | Hattori et al. | 318/778 |
| 4,484,128 | 11/1984 | Jotten et al. | 318/805 |
| 4,555,755 | 11/1985 | Kurosawa et al. | 363/160 |
| 4,680,526 | 7/1987 | Okuyama et al. | 318/802 |
| 4,808,903 | 2/1989 | Matsui et al. | 318/800 |
| 4,814,677 | 3/1989 | Plunkett | 318/254 |
| 4,984,147 | 1/1991 | Araki | 363/84 |
| 5,198,746 | 3/1993 | Gyugyi et al. | 323/207 |
| 5,402,053 | 3/1995 | Divan et al. | 318/768 |
| 5,463,301 | 10/1995 | Kim | 318/801 |

FOREIGN PATENT DOCUMENTS

| | | |
|---|---|---|
| 0469177 | 2/1992 | European Pat. Off. |
| 3202906 | 11/1984 | Germany |
| 3543941 | 6/1987 | Germany |
| 3543983 | 6/1987 | Germany |

OTHER PUBLICATIONS

Patent Abstracts of Japan, vol. 17, No. 85, Oct. 6, 1992 (JP-A-04 281 389).
Patent Abstracts of Japan, vol. 18, No. 47, Oct. 15, 1993 (JP-A-05 268 794).
Siemens Prospectus *Simovert P Spannungszwischenkreis–Umrichter 6SE35/36 & 6SC36/37 fuer Antriebe bis 900kW*, Order No. A19100–E319 A 371, 1989.
Siemens Prospectus *Simovert P Spannungszwischenkreis–Umrichter 6SE12 fuer Antriebe bis 37 KW*, Order No. A 19100–E319–A400, 1990.

*Primary Examiner*—Paul Ip
*Attorney, Agent, or Firm*—Kenyon & Kenyon

[57] ABSTRACT

The invention relates to a method and apparatus for recognizing a standstill condition when restarting a power converter-fed AC motor without a tachometer generator. According to an embodiment of the invention, a standstill recognition method includes first and second active phases decoupled by a passive phase. In each phase, time characteristics of the orthogonal current components of a measured motor current are recorded, and the energy component of current from the second active phase is further evaluated to generate an average value. This generated average value and an upper range value are then compared to a limiting value, which will be exceeded when the AC motor is at a standstill. Thus, through application of a current measurement and a simple evaluation, one can quickly determine the actual state of the power converter-fed AC motor when restarting.

13 Claims, 6 Drawing Sheets

METHOD AND APPARATUS FOR STANDSTILL RECOGNITION WHEN RESTARTING A POWER CONVERTER-FED AC MOTOR WITHOUT A TACHOMETER GENERATOR

BACKGROUND OF THE INVENTION

The invention relates to a method and apparatus for recognizing a standstill condition when restarting a power converter-fed AC motor without a tachometer generator.

Downtimes can occur in manufacturing operations when a power converter which drives a motor cannot be immediately restarted (e.g., after a brief power failure or after having been turned off) because the motor has not yet reached a standstill condition. If a restart is attempted when the power converter frequency does not match the motor frequency of an asynchronous machine, no flux can build up after the restart operation. In a closed-loop control operation, for example, this can lead to generation of very large current amplitudes, causing the power converter to again shutdown due to an overcurrent status. An especially critical situation results when a power converter is automatically restarted without first ensuring the motor is at a standstill.

As soon as the operating voltage regains its previous level and the power converter is restarted, the increasing current flowing through the motor causes the difference between the output frequency of the converter assembly and the motor speed to become increasingly larger. For this reason, the power converter must be provided with a large power capacity, which is uneconomical.

Similarly, if the operating voltage has been removed from the motor for a relatively long period of time, the motor will likely have slowed to a relatively low speed. Immediate application of an operating voltage at the same frequency and the same level as before the failure will then cause a large difference between the output frequency of the power converter and the motor speed, thereby resulting in an undesirably large motor starting current. This phenomenon also occurs when a motor is deactivated due to an operating voltage failure, so that the motor then rotates in a free-running state when the operating voltage is again supplied to the motor at the same frequency and the same level as before the failure.

A well-known method for avoiding such a large motor starting current is to restart the motor only after it has come to a complete standstill regardless of the duration of the power failure. The stationary motor is then restarted by gradually increasing the frequency of the operating voltage supplied to the motor, which is why it takes a relatively long time to restart the motor and return to a steady operating condition. To overcome these disadvantages, commercial converter assemblies are sometimes equipped with a "SEARCH" option and/or a "RECOVERY" option.

The "RECOVERY" option uses a recovery circuit to rebuild the rotor flux which decays after a power converter is shutdown while the machine is running. Such decay occurs in accordance with the rotor time constants in response to an e-function. No large accelerating or braking torques may build-up during this flux build-up, which continues for a defined period of time, after which the closed-loop or open-loop controlled operation of the asynchronous machine is resumed. In the case of speed-controlled drives (i.e., drives whose rotational speed is subject to closed-loop control), the motor is to be restored to its original nominal speed after the recovery operation. The recovery circuit is also supposed to be used when the motor is not equipped with a tachometer.

Methods and apparatus for restarting other types of motors are known in the art. For example, German Patent 32 02 906 C2 discloses a method and apparatus for restarting an induction motor. This method involves supplying the motor with a search voltage, which voltage is itself insufficient to drive the motor, while at the same time varying the frequency of the power converter associated with the motor. While the frequency is being varied, the current flowing through the free-running motor is measured to determine the frequency of the detection voltage which matches the rotational speed of the free-running motor. The frequency so-determined is defined as the starting frequency. Another voltage, again insufficient to drive the motor but now conducted at the starting frequency, is then supplied to the motor. While retaining the starting frequency, this voltage is gradually increased from a starting voltage, and the frequency and the voltage are raised to predetermined values so that the motor operates normally. The method thereby avoids a large motor starting current that increases as the difference between the output frequency of the power converter and the motor speed increases.

German Laid-Open Print 35 43 983 A1 discloses a method for connecting a power converter to a still rotating, not-energized polyphase machine using a search operation that involves continually impressing a nominal current on the stator winding of the power converter, causing the power converter to pass through its possible frequency range. When the power converter frequency and the rotational speed of the rotor roughly conform, the stator voltage rises because of the resulting flux build-up. To this end, the magnitude of the stator voltage rise is continually monitor until a predetermined level is reached, at which point the search speed is reduced. A slip frequency window operation is then run using a diminished search speed. As a result, a flux builds up in the polyphase machine. A desired instantaneous working point of the polyphase machine is deemed to have been reached when this flux reaches a predetermined value. The search operation terminates, and the converter can be connected along with its control system to the still-rotating polyphase machine. This method thus enables the speed of the search operation to be considerably increased.

German Laid-Open Print 35 43 941 A1 discloses another method for determining the rotational speed of a still-rotating polyphase machine. This method involves evaluating at least one sinusoidal voltage that is induced by the remanence of the rotor in the stator windings, which voltage corresponds in frequency to the rotational speed of the rotor. This sinusoidal voltage, which is supplied to a stator terminal, is then converted by means of a square-wave shaper into a square-wave voltage having a symmetrical waveshape and a frequency and phase position conforming to the frequency and phase position of the induced sinusoidal voltage. An output signal is subsequently generated with a frequency proportional to the square-wave voltage. Since the frequency or cycle duration of this induced sinusoidal voltage is not dependent upon the machine type or the machine temperature, one obtains a method that applies generally to polyphase machines. By defining the rotational speed of the still-rotating polyphase machine in this manner, it is possible to connect the power converter (having a frequency corresponding to the rotor frequency) to the still-rotating polyphase machine substantially faster than the method described above because the search speed is no longer dependent upon the frequency window of the polyphase machine.

Yet another method and apparatus for restarting an induction motor are disclosed in EP Patent Application 0 469 177

A1. In this method, at least two remanence frequency values are determined from remanence voltage values measured at different instants, from which an acceleration value of the "coasting" (i.e., rotating as a result of inertia) motor is determined. At the end of this acceleration measurement, an output frequency value is set to the last-determined remanence frequency value. The acceleration measurement is then followed by the recovery of the motor, which takes place during an adjustable excitation period. Power converter pulses are released at the start of this excitation period, upon which the remanence of the machine is immediately lost. Therefore, during the excitation period, starting from the set output frequency value of the power converter, the output frequency value is interpolated with the determined acceleration value, so that the output frequency value is corrected to the actual rotational-speed value of the coasting machine. Thus, the interpolation of the output frequency value of the power converter represents a simulation of the actual rotational-speed value of the "coasting" machine; that is, a measured-value equivalent parameter is determined. The machine flux is also built up during the excitation period by setting the output voltage value of the frequency converter to high. As soon as the adjusted excitation time has elapsed, the "recovery" state is abandoned and a switch is made to closed-loop control operation. In this case, starting out from the last determined interpolated output frequency value of the frequency converter, the rotational speed is again brought to the original rotational speed in accordance with an adjusted starting time.

In this method, torque production during the recovery process should be kept as small as possible, which is accomplished by the motor allowing, for example, 90% of its magnetization to decay. A de-excitation time, which begins with the switching off of the power converter, is therefore adjusted to 2.3 times the rotor time constant.

The rise between the first and the last determined remanence frequency value is calculated during the adjustable acceleration measuring time. The shorter the measuring time, the faster the machine's current rotational speed is determined. The acceleration measuring time is converted into a number of periods of the remanent voltage, so that the actual acceleration measuring time changes slightly along with the changing rotational speed. The acceleration measuring time is supposed to correspond to at least the time of two periods of the remanent rotational speed.

The duration of the flux build-up can be determined using the adjustable excitation period. The longer the adjustable excitation period is, the more the recovery circuit works free from torque. By contrast, the shorter the excitation period is, the faster the current rise and the transition to closed-loop control operation occurs.

A disadvantage of this known method is that the rotational speed of a still-rotating polyphase machine cannot be determined without considerable expenditure of time and energy when the rotational speed is very low. At very low rotational speeds, the search operation is often interrupted after a pair of cycles with the result "machine not found." This requires that an operator then shut-down and restart the machine, which takes considerable time.

Moreover, at very low frequencies of the drive, the stator and lead resistances influence the voltage specifications, so that the "search" or the "recovery" of the polyphase machine are adversely affected. The result is that the "SEARCH" or "RECOVER" options can no longer be employed below a certain rotational speed with causing the power converter to malfunction.

SUMMARY OF THE INVENTION

The object of the present invention is to provide a method and apparatus for recognizing a standstill condition when restarting a power converter-fed AC motor without a tachometer generator. According to one embodiment of the invention, the method is divided into two active phases coupled by a passive phase. The time characteristics of the motor current are measured during each active phase and the orthogonal current components of the time characteristics are recorded. To ensure these current components obtain a profile that is characteristic of the rotational speed of the motor, a DC current is impressed in one phase of the AC motor during the first active phase (the magnetization phase). A flux builds up in the rotor of the motor in dependence upon the rotational speed of the still-rotating AC motor. In the second active phase (the short-circuit phase), the motor is short-circuited at its terminals. Characteristic current profiles will occur in this phase if a significant flux was able to build up in the first active phase. The passive phase (the idle speed phase) decouples the two active phases from one another and the duration of this phase can be selected to be very short. The passive phase serves to zero the stator current so that there is no need to wait for the stator time constants in the second active phase.

By this method, one initially obtains four time characteristics of current components of the motor current during the two active phases. However, recognition of a standstill condition advantageously requires further processing of the time characteristic of an orthogonal current component. This processing involves generating an average value from the time characteristic of the energy component of current (i.e., the orthogonal current component in the stator voltage direction) from the second active phase. This generated average value is then compared to a predetermined limiting value. In addition, the present value of the energy component of current at the end of the second active phase is likewise compared to a predetermined limiting value. If both limiting values are exceeded, it can be concluded that the power converter-fed AC motor is at a standstill.

Once a standstill condition is detected, one can immediately activate the closed-loop control of the power converter so that the AC motor is restarted. Thus, using the present invention, one can determine very quickly through current measurements whether or not the power converter-fed AC motor is at a standstill without the need for a tachometer generator. As a result, downtimes in manufacturing are reduced and the power converter no longer malfunctions at low rotational speeds.

In another advantageous embodiment of the present invention, the recorded characteristic curves of the reactive current component from the first active phase, the energy component of current, and the reactive current component from the second active phase are all evaluated such that a standstill is indicated when the generated average values of these current component amounts each exceeds a predefined limiting value. This additional processing of the plotted current components significantly enhances the accuracy of the standstill recognition.

In another advantageous embodiment, the DC current is impressed as a controlled current by means of the power converter, in that a manipulated variable whose amplitude is predefined in dependence upon the rated nominal current for the motor and a total resistance of the drive is fed to the power converter. Using pulses, the power converter produces a voltage space vector equal in amount to the amplitude of the manipulated variable and having a frequency of 0 Hz. This controlled DC voltage leads to a current build-up that is characteristic of rotational speed. If the AC motor is at a standstill, or if it rotates at only a very low rotational speed, then a flux is induced in the rotor of the machine by means of the DC current (this is not the case when the machine rotates at a high rotational speed). The time duration of the first active phase is dependent upon the level of the controlled DC voltage and should be at least high enough to allow a steady-state upper range value for current to settle.

In yet another advantageous embodiment, the DC current is impressed as a controlled current by means of the power converter in that a manipulated variable is fed to the power converter, which variable is equal to a manipulated variable of a current control with which the motor current is controlled to a current setpoint value. In the case of this magnetization of the AC motor, one does not obtain any current build-up that is characteristic of rotational speed. Thus, the recording of the time characteristics of orthogonal current components of the measured motor current is eliminated from the first active phase. Since the time characteristics of the current components from the first active phase are not needed to detect standstill, the method and the corresponding apparatus for implementing the method are simplified.

In yet another advantageous embodiment, the recorded time characteristic of the reactive-current component of the first active phase and the plotted time characteristic of the reactive-current component of the second active phase are evaluated. A negative operational sign for the present value of the reactive-current component at the beginning of the first active phase and a positive operational sign for the present value of the reactive-current component at the beginning of the second active phase indicates the motor is rotating to the right; while inverted operational signs for these values indicates the motor is rotating to the left. Thus, with an additional simple evaluation of the existing recorded time characteristics of the orthogonal current components of the measured motor current, this variation also provides a method for determining a direction of rotation when the motor is not in a standstill condition.

In a final embodiment, one frequency value is calculated for each of the recorded time characteristics of the reactive-current components of the first and second active phase and the recorded time characteristic of the reactive-current component of the second active phase using arithmetic operations. These frequency values are then compared to one another. Assuming the frequency values are approximately equal, a starting frequency for a search process is defined whose value is greater than the arithmetic average value or greater than the largest of the frequency values calculated during the second active phase. Thus, with one additional evaluation of the existing recorded time characteristics of the orthogonal current components of the measured motor current, this embodiment further provides a method for defining a starting frequency for a search operation.

By preprocessing and storing a measured motor current in accordance with the invention during two active phases (i.e., magnetization and short-circuit), in which the drive is situated in two operating points, one obtains a great deal of information about the actual state of a power converter-fed AC motor without a tachometer generator in the case of restarting, which can be recovered using various evaluation methods. Thus, one can restart the AC motor after only a short time, thereby reducing production downtimes.

The features and advantages of the present invention are described in detail below with reference to the drawing figures, in which one exemplary embodiment of an apparatus for implementing a method according to the present invention is illustrated schematically.

DETAILED DESCRIPTION

Figure 1:
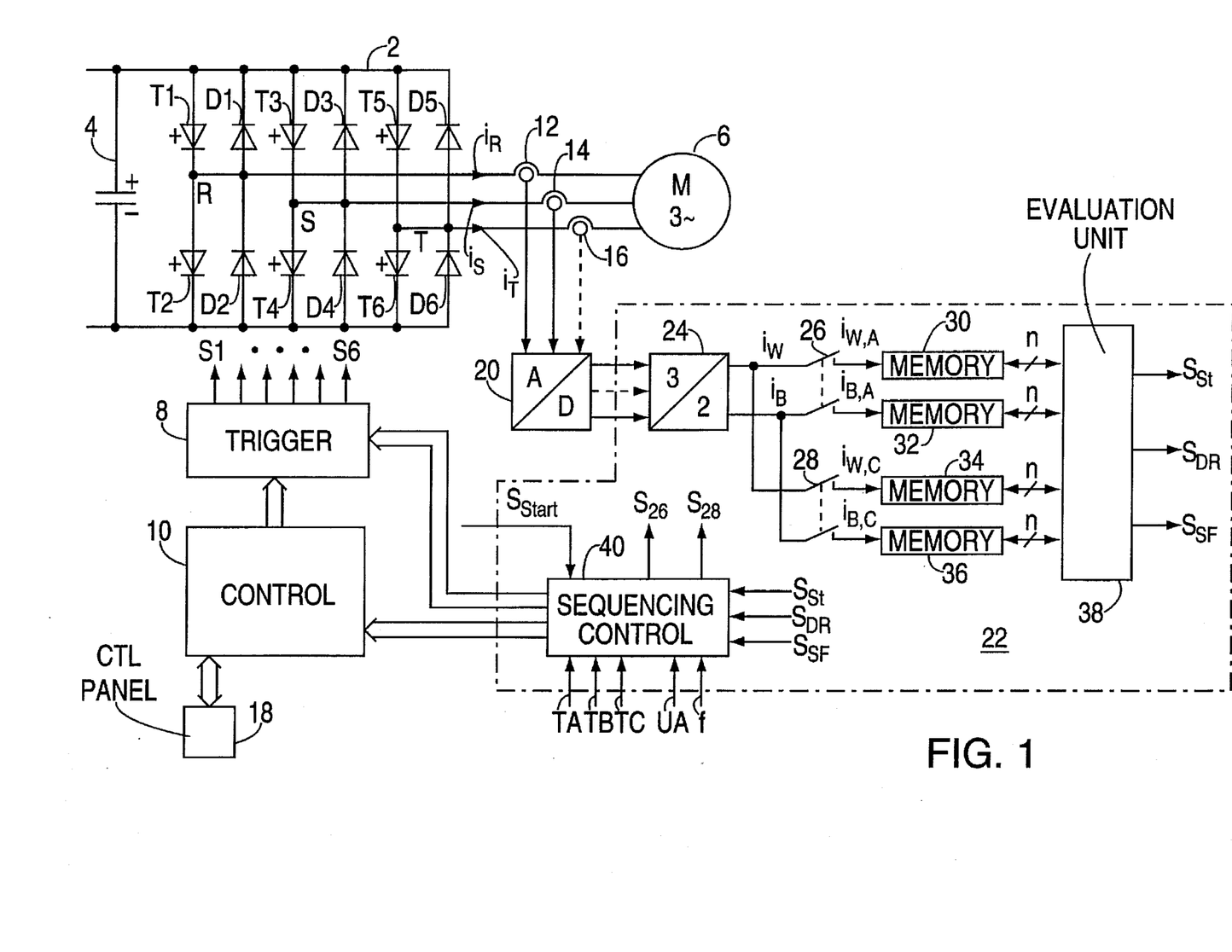
FIG. 1 is a block diagram of an apparatus for recognizing standstill according to the present invention.

FIG. 1 shows an equivalent circuit diagram of a machine-side power converter 2, also called a power inverter, which has disconnectable power semiconductors T1 through T6 which may be, for example, gate turn-off thyristors. Power transistors may also be used in place of the gate turn-off thyristors T1 through T6. On the input side, the power converter 2 is connected to a voltage link 4. This voltage link 4 is fed on the input side via a supply-side power converter or rectifier (not shown) from a three-phase AC power supply. A direct voltage supply (in industrial systems, a "DC-current bar") may also be used. An AC motor 6 without a tachometer generator is connected on the output side. Free-wheeling diodes D1 through D6 are electrically connected in parallel to each of the gate turn-off thyristors T1 through T6. During operation, the phases of the power converter 2 are activated to alternately connect the output terminals R, S and T to the plus or minus potential of the voltage link 4. For the pulse-controlled AC converter 2 of this embodiment, voltage and frequency must be specified in a suitable manner for a specific operating state, which may be realized through modulation of the actually adjustable voltage space vector (i.e., pulse-width modulation). To this end, the partially-depicted converter assembly has a trigger module 8 (also called a modulator), a control module 10, and measured-value devices for current and voltage, of which only the measured-value devices 12, 14 and 16 for detecting the power converter output currents $i_R$, $i_S$ and $i_T$ are shown. The two measured-value devices 12 and 14 are also sufficient to determine the motor current i.

Open-loop and closed-loop control of this known pulse-controlled AC power converter may be fully digitized. All functions, including trigger equipment, operator prompting and extensive protective functions, are processed through one or two 16-bit microprocessors (not shown). A frequency control (U/F-characteristic curve), a vector control used for rotational-speed control, and a vector control used for torque control may be provided as system variations. Such a pulse-controlled AC converter, shown in cutaway, is described in detail in the Siemens prospectus "SIMOVERT P Voltage-link AC Converters 6SE35/36 and 6SC36/37 for Drives up to 900 Kw," Order No. A 19100-E319-A371

(1989). A general circuit diagram of a frequency/rotational-speed control can also be inferred by one skilled in the art from this prospectus.

Another specific embodiment of the control module 10 can be inferred from the Siemens prospectus "SIMOVERT P Voltage-link AC Converters 6SE12 for Drives up to 37 Kw," Order No. A 19100-E319-A400 (1990). This control module combines sequencing control and operation functions, field-oriented control and secondary phase current control functions. Additionally, a control terminal strip, an interface to the control panel and an additional interface are also arranged on the control module. A rotating voltage vector is applied as a manipulated variable at the output of the control module 10 and is then supplied to the trigger module 8. Using the trigger module 8, manipulated variables produced by the control are converted as potential-isolated variables into corresponding on/off commands for the power semiconductors T1 through T6 of the power converter 2. This known pulse-controlled AC converter also has a control panel 18 facilitating the various functions and adjustments of the pulse-controlled AC converter, such as parameterization, start-up, and specification of setpoint values. Since the open-loop and closed-loop control is fully digitized, an analog-to-digital (A/D) converter 20 is connected to the measured-value devices 12, 14 and 16 in the outgoing circuit.

The known power converter of FIG. 1 is provided with a standstill recognition device 22 for use in restarting the power converter-fed AC motor 6 without a tachometer generator. The illustrated embodiment of the standstill recognition device 22 includes a coordinate converter 24, two double switches 26 and 28, four memory units 30, 32, 34 and 36, an evaluation unit 38 and a sequencing control 40. The coordinate converter 24 is connected on the input side to the analog-digital (A/D) converter 20 and, on the output side, to each of the double switches 26 and 28, whose outputs are in turn linked to the memory units 30, 32, 34, 36. The outputs of the memory units 30, 32, 34, 36 are electroconductively connected to the evaluation unit 38. Output signals $S_{Sr}$, $S_{DR}$ and $S_{SF}$ of the evaluation unit 38 are fed to a sequencing control 40, which is further supplied with a start signal $S_{Start}$ and parameters TA, TB, TC, UA and f for initializing the standstill recognition method according to the present invention. The sequencing control 40 generates switching signals $S_{26}$ and $S_{28}$ for the double switches 26 and 28, as well as control signals for the trigger module 8 and the control module 10 of the power converter assembly. From the digitized measured values of the power converter output currents $i_R$ and $i_S$ (or, alternatively, $i_R$, $i_S$ and $i_T$), the coordinate converter 24 produces orthogonal current components $i_W$ and $i_B$ is of a motor current i of a fixed-stator frame cartesian coordinate system $\alpha$, $\beta$. In this case, the current component $i_W$ coincides with the $\alpha$-axis of this cartesian coordinate system $\alpha$, $\beta$, and relates to the stator-voltage space vector of the three-phase motor 6. Thus, the orthogonal current component is designated with $i_W$ for the active current component and $i_B$ for the reactive current component of the motor current i. Since two orthogonal current components $i_W$ and $i_B$ of the motor current i are determined on the control module 10 already on the basis of the digitized measured values of the power converter output currents $i_R$ and $i_S$, the coordinate converter 24 of the standstill recognition device 22 may optionally be eliminated. Instead, the orthogonal current components $i_W$ and $i_B$ of the control module 10 can be applied via the sequencing control 40 to the inputs of the two double switches 26 and 28. A microprocessor can be provided as the evaluation unit 38 and may also perform the function of the sequencing control 40. In a preferred embodiment, the standstill recognition device 22 is itself implemented as a microprocessor. If the two 16-bit microprocessors of the open-loop and closed-loop control of the known power converter assembly are not yet utilized to capacity, then a separate microprocessor would not be necessary for the standstill recognition device 22, since the method according to the present invention may be integrated as a software program in the open-loop and closed-loop control.

Figure 2:
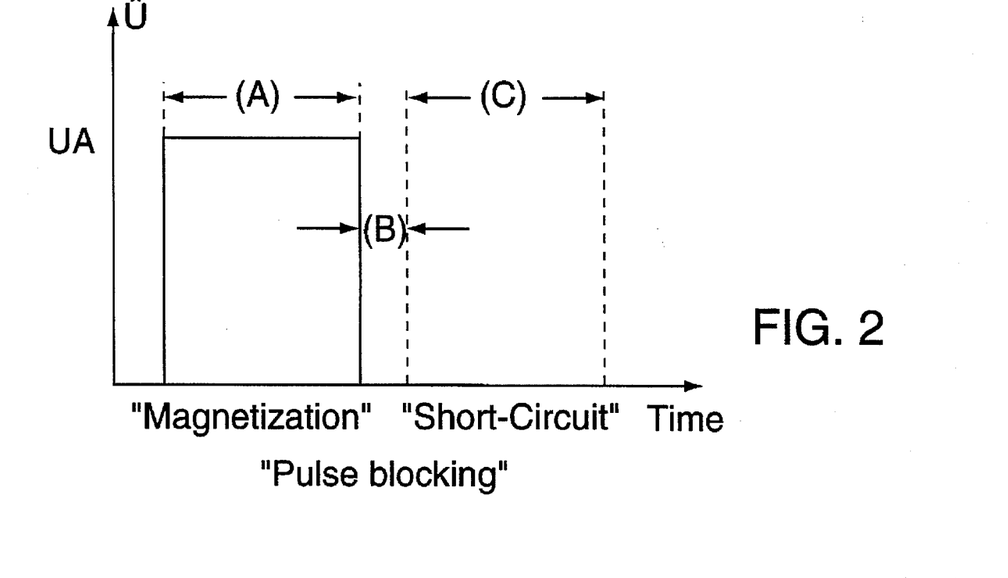
FIGS. 2–4 respectively show the characteristic curves of the voltage, pulse release and phase current, diagrammed over time.
Figure 3:
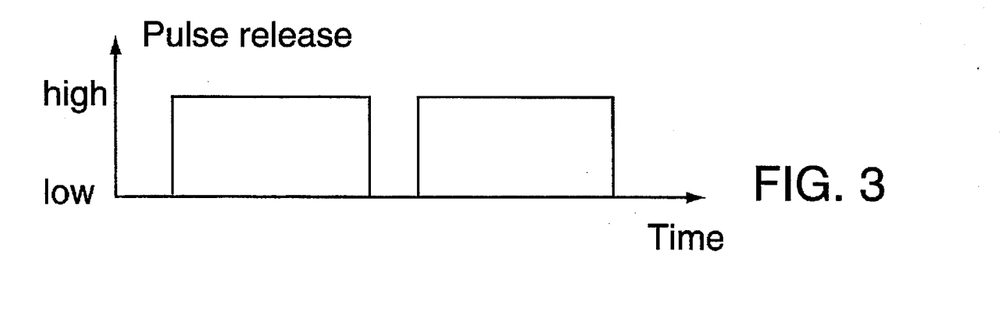
Figure 4:
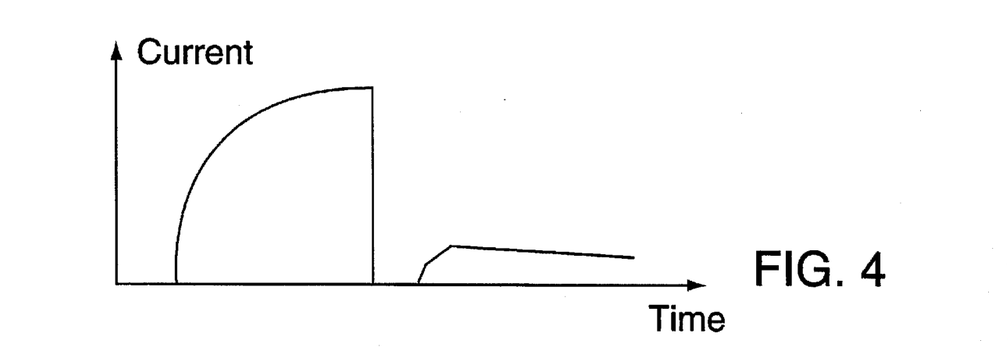
Figure 5:
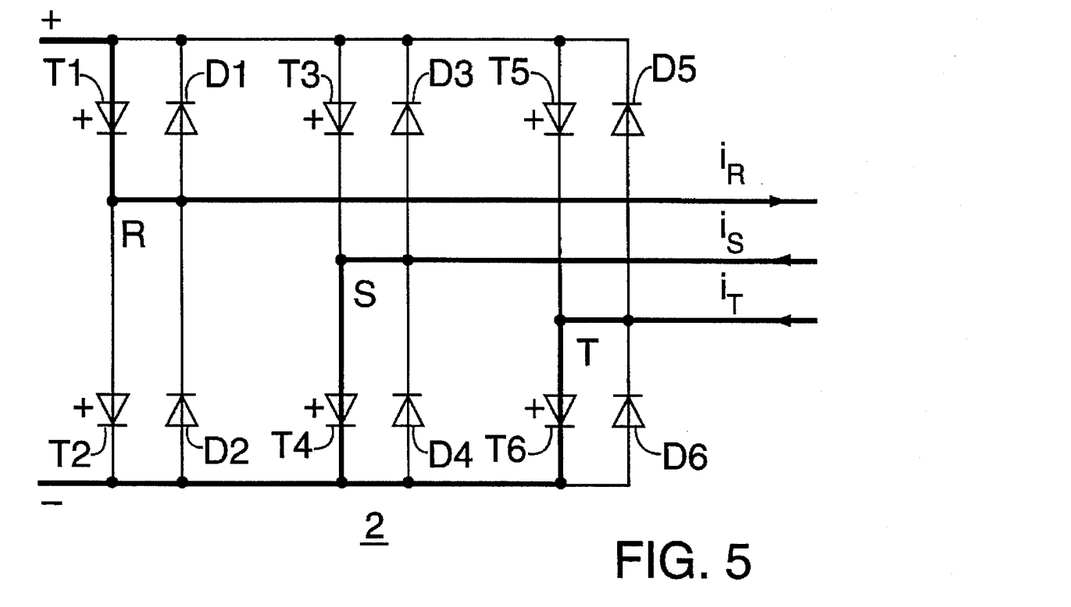
FIG. 5 shows the current flow through a power converter during the first active phase of a method according to the present invention.
Figure 6:
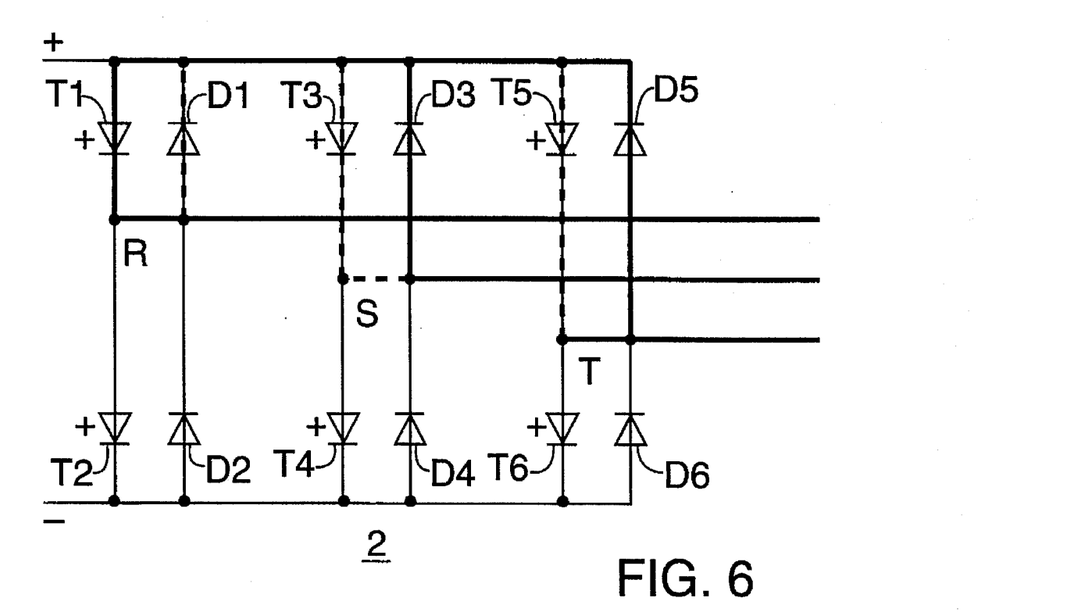
FIG. 6 shows the current flow through a power converter during the second active phase of a method according to the present invention.

A method for standstill recognition according to the present invention may be subdivided into three phases A, B and C. These phases are a first active phase A, a passive phase B, and a second active phase C. During the first active phase A (the magnetization phase), a direct voltage UA is applied to the machine terminals (see FIG. 2). For this purpose, a voltage space vector of the amount UA and having a frequency of 0 Hz is supplied by the sequencing control 40 to the trigger module 8 of the power converter 2. From this, the trigger module 8 generates control signals S1, . . . , S6, so that the disconnectable power semiconductors T1, T4 and T6 are conductive (see FIG. 5). As a result, a DC current flows in phase R of the AC motor (see FIG. 4). During this first active phase A, the double switch 26 is closed and the double switch 28 is opened. Furthermore, the time characteristics of the orthogonal current components $i_{W,A}$ and $i_{B,A}$ are continually recorded in the memory units 30 and 32, respectively. During the passive phase B (the transition or idle speed phase), the power converter 2 is not driven; that is, the control signals S1, . . . , S6 are blocked (see FIG. 3). Then, in the second active phase C (the short-circuit phase), the motor 6 is short-circuited at its terminals (see FIG. 2). This is accomplished by the power converter 2 using a so-called zero (null) vector. To this end, the trigger module 8 generates control signals S1, . . . , S6 such that the disconnectable power semiconductors of one bridge half (e.g., T1, T3 and T5) of the power converter 2 are triggered (see FIG. 6). Depending on whether a significant flux was able to build up in the first active phase A, a typical current characteristic occurs (see FIG. 4). During this second active phase C, the double switch 28 is closed and the double switch 26 is opened, and the time characteristics of the orthogonal current components $i_{W,C}$ and $i_{B,C}$ are continually recorded in the memory units 34 and 36, respectively.

Figure 7:
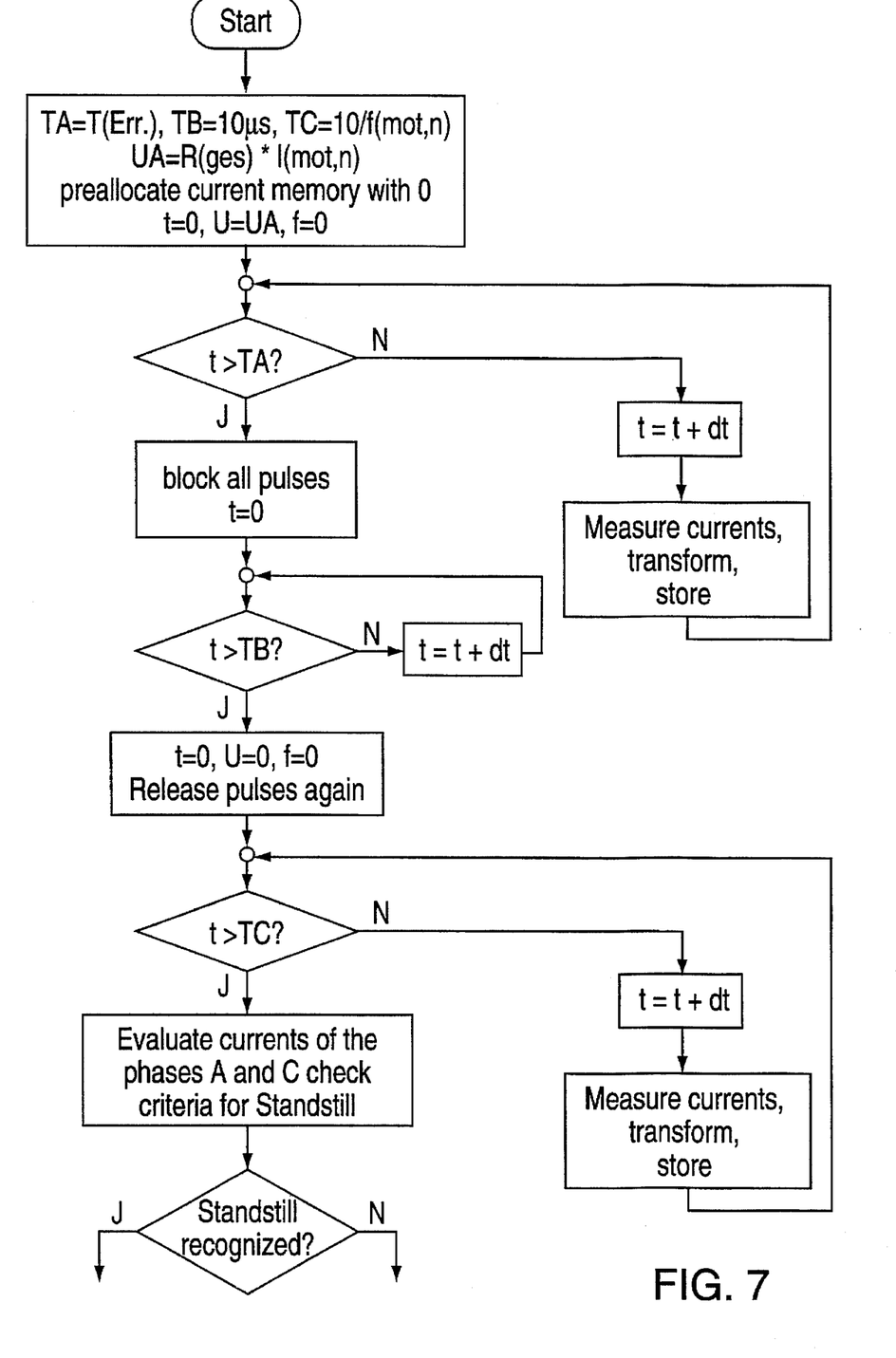
FIG. 7 is a flow chart depicting a method for recognizing standstill according to the present invention.

The standstill recognition method according to the present invention can be seen in greater detail through the block diagram of FIG. 1 and the flow chart of FIG. 7. During initial operation of the drive, the parameters for initializing the standstill recognition method can be read from the control panel 18 into the sequencing control 40 of the standstill recognition device 22. These parameters are, for example, time durations TA, TB and TC of the phases A, B and C, the amplitude UA of the direct voltage and the frequency value of 0 Hz. The time duration TA of the first active phase A is dependent upon the amplitude UA of the direct voltage, and is preferably selected to be at least long enough to allow a steady-state upper range value for current to settle (see FIG. 3). The time duration TA should be at least 100 ms, but can be up to several seconds. The ideal time duration TA will depend on the actual performance of the motor 6. As a basis for setting this value, one can select the sum of the stator time constant and the rotor time constant of the motor 6. The time duration TB of the passive phase B can be selected to be very short; for example, less than 10 ms. In the passive phase B, the stator time constant of the three-phase motor 6 can be passed over, so that the two active phases A and C are decoupled from one another. The time duration TC of the second active phase can be set, for example, to the multiple reciprocal value of the rated frequency (e.g., 10·1/$f_n$). The amplitude UA of the direct voltage corresponds to the voltage drop across the entire resistance of the drive given a rated DC current power supply. This value, as well, is dependent upon the characteristics of the drive.

Upon receipt of the start signal $S_{Start}$, the initialization parameters are activated, the memory units 30, 32, 34, 36 and the time are set to zero, and the double switch 26 is closed. During the first active phase A, the elapsed time is compared to the time duration TA with every clock pulse, and the orthogonal current components $i_{W,A}$ and $i_{B,A}$ (see FIGS. 8 through 10) are written into the memory units 30 and 32, respectively. As soon as the elapsed time is equal to the time duration TA, all pulses are blocked, the time is reset to zero and the double switch 26 is reopened. The passive phase B then begins, in which only the elapsing time is compared to the predetermined time duration TB. If the elapsing time in the passive phase B is equal to the predetermined time duration TB, then the time, the amplitude value of the direct voltage and the frequency value are set to zero and the double switch 28 is closed. During the depicted time loop, orthogonal current components $i_{W,C}$ and $i_{B,C}$ (see FIGS. 8 through 10) are respectively stored with every clock pulse in the memory units 34 and 36. At the end of the second active phase C, the double switch 28 is reopened and the evaluation program is started.

Figure 8:
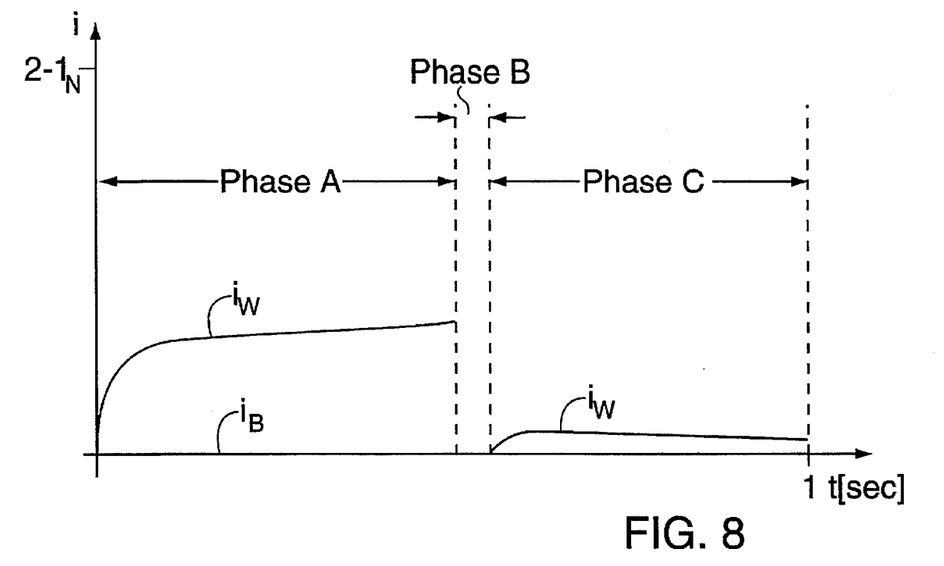
FIGS. 8–10 respectively show the time characteristics of the current components of a measured motor current during the active phase at standstill, at a low rotational speed, and at the rated speed of the AC motor, diagrammed over time.
Figure 9:
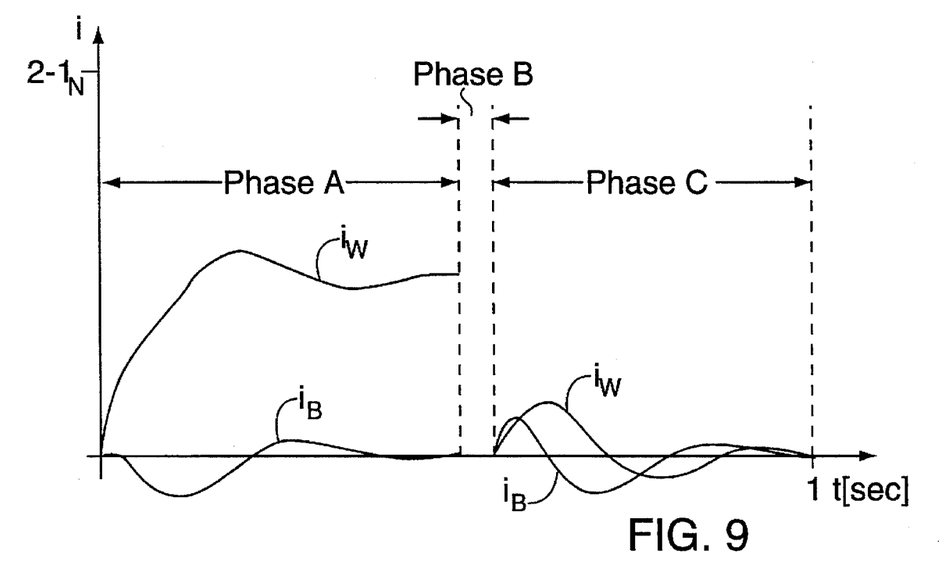
Figure 10:
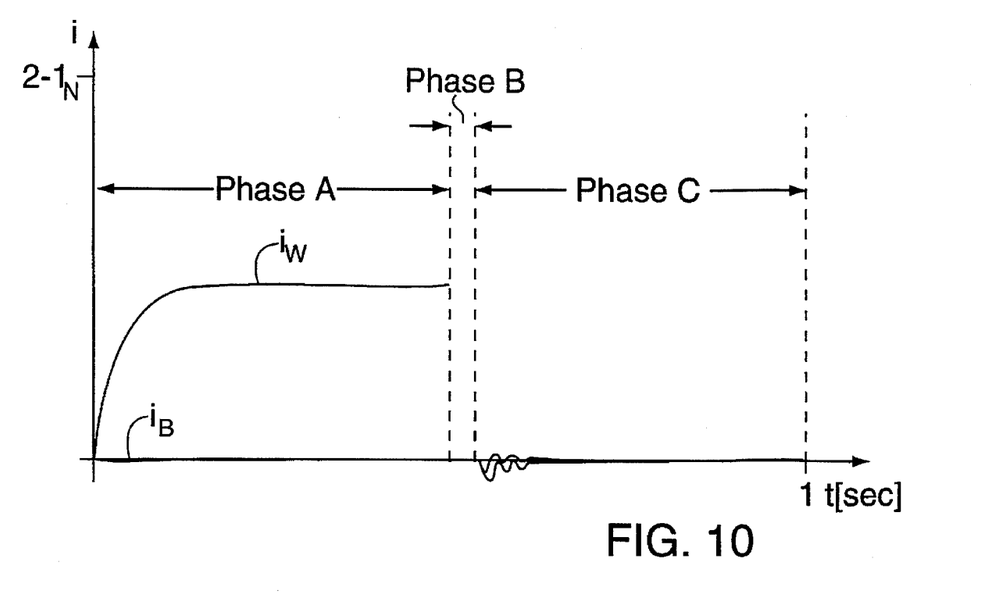

At the end of the three phases A, B and C, the memory units 30, 32, 34, 36 each contain the time characteristics of the current components $i_{W,A}$, $i_{B,A}$ from phase A and the time characteristics of the current components $i_{W,C}$, $i_{B,C}$ from phase C (see FIGS. 8 through 10).

Using the time characteristic of the energy component of current $i_{W,C}$, the evaluation unit 38 generates an average value according to the equation:

$$\overline{I_{W,C}} = \frac{1}{N} \sum_{n=1}^{N} i_{W,Cn} > 0.015 * I_{mot,n}$$

and compares this average value to a limiting value (e.g., 0.015·$I_{mot,n}$. Moreover, according to the equation $$I_{W,Cn=TC} > 0$$

the upper range value of the energy component of current $i_{W,C}$ is compared to a limiting value in phase C. If the average value $\overline{I_{W,C}}$ of the energy component of current $i_{W,C}$ in the second active phase C exceeds a predetermined component of the rated current $I_{mot,n}$ of the AC motor 6, and if the upper range value $I_{W,C}$ of the current component $i_{W,C}$ of the phase C is positive, it is then certain that the AC motor 6 is at a standstill. Thus, the signal $S_{St}$ at the output of the evaluation unit 38 changes from low to high, thereby actuating the restart of the motor 6. On the other hand, if one of these conditions is not fulfilled, the motor 6 is not at a standstill.

To increase the accuracy of the standstill recognition method still further, the following additional conditions may be checked according to the equations:

$$\overline{I_{B,A}} = \frac{1}{N} \sum_{n=1}^{N} |i_{B,An}| > \text{threshold}$$

$$\overline{I_{W,C}} = \frac{1}{N} \sum_{n=1}^{N} |i_{W,Cn}| > \text{threshold}$$

$$\overline{I_{B,C}} = \frac{1}{N} \sum_{n=1}^{N} |i_{B,Cn}| > \text{threshold}$$

Thus, the average values of the reactive current amount is calculated in phase A, the reactive current amount in phase C, and the active current amount in phase C. If each average value amount $\overline{I_{B,A}}$, $\overline{I_{W,C}}$, $\overline{I_{B,C}}$ exceeds a predetermined threshold value, then the AC motor 6 is at a standstill.

If the AC motor 6 is not at a standstill, then a transition is not made to the converter state "OPERATION", in which automatically controlled sequential starting from f=0 to f=$f_{setpoint}$ occurs. Instead, a transition is made to the converter state "SEARCH".

Additional information can be recovered from the recorded time characteristics of the current components $i_{W,A}$, $i_{B,A}$, $i_{W,C}$ and $i_{B,C}$, using additional evaluation procedures. For example, if it has been established that the AC motor 6 is not at a standstill, one can determine the direction of rotation (i.e., left or right) by checking the operational sign of the reactive current component $i_{B,A}$ from phase A and the reactive current component $i_{B,C}$ from phase C. The conditions indicating the motor 6 is rotating to the right are:

$$I_{B,An=10\% \, TA} < 0$$

$$I_{B,Cn=10\% \, TC} > 0.$$

The conditions indicating the motor 6 is rotating to the left are:

$$I_{B,An=10\% \, TA} > 0$$

$$I_{B,Cn=10\% \, TC} < 0.$$

Thus, without a costly evaluation, one can readily obtain additional information about the direction of rotation of an AC motor 6 that is not at a standstill. This information can be indicated, for example, when the output signal $S_{DR}$ from the evaluation device 38 changes from the low state to the high state when a motor 6 is rotating to the right.

Moreover, once the direction of rotation of the AC motor 6 has been established, one can determine the frequencies of the stored time characteristics of the current components $i_{B,A}$, $i_{W,C}$ and $i_{B,C}$ using known computational operations, such as a Fourier transform or an autocorrelation series. If these three determined frequency values lie roughly together, then a subsequent "SEARCH" operation can begin with a frequency which lies slightly above the arithmetic average value or the maximum value of the frequencies of the current components $i_{W,C}$ and $i_{B,C}$ in the second active phase C instead of at $f_{max}$, thereby shortening the search operation for the rotating polyphase motor 6. A starting frequency $S_{SF}$ greater than the determined frequencies will prevent the drive from becoming regenerative during the search operation and from being fed back into the voltage link 4, which would cause the converter to switch off with an "overvoltage" malfunction.

While the present invention has been described with reference to specific embodiments, persons skilled in the art will recognize that many modifications and variations are possible. Accordingly, the present invention embraces all alternatives, modifications and variations that fall within the spirit and scope of the appended claims, as well as all equivalents thereof.

What is claimed is:

1. A method for recognizing a standstill condition of a three-phase AC motor driven by an inverter, the method comprising the steps of:

a) driving the inverter for a first time duration to induce a DC current through a phase of the three-phase AC motor;

b) during the first time duration, measuring a time characteristic of a motor current and recording an energy component of the motor current and a reactive component of the motor current;

c) after the first time duration has lapsed, turning off the inverter for a second time duration;

d) after the second time duration has lapsed, driving the inverter for a third time duration so as to short-circuit the three-phase AC motor;

e) during the third time duration, measuring the time characteristic of the motor current and recording the energy component of the motor current and the reactive current component of the motor current;

f) after the third time duration has lapsed, calculating an average value from the energy component of the motor current recorded during the third time duration;

g) comparing the average value to a preselected limiting value;

h) comparing an upper range value of the energy component of the motor current, recorded during the third time duration, to a predefined limiting value; and i) determining that the three-phase AC motor is at a standstill if the average value during the third time duration is greater than the predefined limiting value and the upper range value is positive.

2. The method of claim 1, wherein said DC current is induced in a phase of the three-phase AC motor as an open-loop controlled current by feeding a manipulated variable to a trigger control circuit coupled to the inverter, said manipulated variable having a predefined amplitude dependent upon a rated current of the motor and a total resistance of a drive of the motor.

3. The method of claim 1, wherein said DC current is induced in a phase of the three-phase AC motor as a closed-loop controlled current by feeding a manipulated variable to a trigger control circuit coupled to the inverter, said manipulated variable being equal to a second manipulated variable of a current control by which the motor current is controlled to a current setpoint value.

4. The method of claim 1, wherein the first time duration is sufficient to permit a steady-state upper range value for current to settle.

5. The method of claim 1, wherein the third time duration is greater than or equal to a multiple reciprocal value of a rated frequency of the three-phase AC motor.

6. The method of claim 1, wherein the second time duration is sufficient to permit a stator current of the motor to reach zero.

7. The method of claim 1, wherein currents of two phases of the three-phase AC motor are measured and converted into the energy and reactive components of the motor current using a coordinate transformation.

8. The method of claim 1, comprising the steps of:

j) calculating a first average value from the reactive current component recorded during the first time duration, and comparing the first average value to a predefined threshold value;

k) calculating a second average value from the energy component of the motor current recorded during the third time duration, and comparing the second average value to a predefined threshold value;

l) calculating a third average value from the reactive current component recorded during the third time duration, and comparing the third average value to a predefined threshold value; and m) determining that the three-phase AC motor is at a standstill when each of the average values exceeds a predefined threshold value.

9. A method for recognizing a direction of rotation of a three-phase AC motor driven by an inverter, said method comprising the steps of:

applying a DC current to a phase of the motor during a first time interval;

measuring a time characteristic of a motor current during the first time interval;

disabling the driving of the motor and allowing the motor to run in idle operation during a second time interval;

short-circuiting the motor across its terminals during a third time interval;

measuring a time characteristic of the motor current during the third time interval;

recording a plurality of orthogonal current components based on the measurements in said first and third time intervals, wherein recorded reactive current components of said first and third time intervals are evaluated such that it is determined that the motor is rotating in a first direction when an instantaneous value of said reactive current component at a beginning of said first time interval has a negative operational sign and an instantaneous value of said reactive current component at a beginning of said third time interval has a positive operational sign, and it is determined that the motor is rotating in a second direction when said operational signs are inverted.

10. The method of claim 9, further comprising the steps of:

calculating a frequency value for each of the reactive current components recorded during the first and third time intervals and for the energy component of the motor current recorded during the third time interval;

comparing the calculated frequency values to one another; and starting a search process if the calculated frequency values are approximately equal, the search process being started at a frequency that is greater than an average value of the calculated frequency values of the reactive current component and the energy component of the third time interval.

11. An apparatus for recognizing a standstill condition of a three-phase AC motor driven by an inverter, said apparatus comprising:

a coordinate converter;

a plurality of memory units;

a plurality of double switches coupled between said coordinate converter and said plurality of memory units;

an evaluation unit connected to said plurality of memory units; and a sequencing control coupled to said evaluation unit, said sequencing control being coupled to a control input of each of said plurality of double switches and to a control element and a trigger element of the power converter.

12. The apparatus of claim 11, wherein said evaluation unit and said sequencing control form a single module.

13. The apparatus of claim 12, wherein at least one of the elements of the apparatus is implemented with a microprocessor.

* * * * *